United States Patent [19]
Steinke et al.

[11] Patent Number: 6,093,466
[45] Date of Patent: Jul. 25, 2000

[54] AUTOMOBILE PROTECTIVE MASKING MATERIAL

[75] Inventors: Charles Philip Steinke, Woodbury, Conn.; Douglas Ivor Farrington, Hohokus, N.J.; Charles Paul Kannankeril, North Caldwell, N.J.; Joseph Anthony Lacopo, Branchville, N.J.; Michael Mark Metta, Wayne, N.J.

[73] Assignee: Sealed Air Corporation, Saddle Brook, N.J.

[21] Appl. No.: 08/978,313

[22] Filed: Nov. 25, 1997

[51] Int. Cl.[7] .............................. B32B 3/04; B65D 65/02
[52] U.S. Cl. ................ 428/40.1; 206/335; 206/497; 296/137; 428/41.7; 428/42.1; 428/192; 428/194
[58] Field of Search ........................ 428/68, 71, 72, 428/74, 76, 40.1, 41.7, 41.8, 42.1, 192, 194; 206/497, 335; 296/137

[56] References Cited

U.S. PATENT DOCUMENTS

| | | | |
|---|---|---|---|
| 2,082,791 | 6/1937 | Copeman | 280/152 |
| 3,350,247 | 10/1967 | Steinberg | 428/68 |
| 3,811,996 | 5/1974 | Polk | 428/71 |
| 4,038,447 | 7/1977 | Brock | 428/71 |
| 4,821,785 | 4/1989 | Rolan | 150/166 |
| 5,056,817 | 10/1991 | Fuller | 280/770 |
| 5,057,169 | 10/1991 | Adelman | 156/71 |
| 5,127,974 | 7/1992 | Tomiyama et al. | 156/85 |
| 5,277,954 | 1/1994 | Carpenter | 428/71 |

FOREIGN PATENT DOCUMENTS

| | | |
|---|---|---|
| 4400392 A1 | 6/1994 | Germany . |
| 63-2519 | 7/1989 | Japan . |

*Primary Examiner*—Nasser Ahmad
*Attorney, Agent, or Firm*—Alston & Bird LLP

[57] ABSTRACT

A masking material for protecting the surface, or finish thereon, of a product, such as an automobile, during assembly, storage, shipment or transport including a bottom layer of plastic film adapted to have the lower surface thereof adhered to the surface to be protected, a cushioning layer disposed in superposed relation to the bottom layer and having lengthwise and widthwise dimensions smaller than the corresponding dimensions of the bottom layer such that the bottom layer protrudes for a predetermined distance beyond the periphery of the cushioning layer, and a top layer disposed in superposed relation to the cushioning layer and the bottom layer and having lengthwise and widthwise dimensions greater than the corresponding dimensions of the cushioning layer, the top layer being adhered to the cushioning layer and the bottom layer.

21 Claims, 2 Drawing Sheets

AUTOMOBILE PROTECTIVE MASKING MATERIAL

FIELD OF THE INVENTION

The present invention relates to the protection of surfaces and finishes on surfaces and more particularly to a cushioned masking material for such surfaces and finishes.

BACKGROUND OF THE INVENTION

It is now common practice to protect the surfaces and finishes on such surfaces of products during handling, shipment and transport by applying a masking material over the surface and finish to be protected. In the automobile industry, for example, such a masking material currently in use comprises a plastic film having an adhesive layer on one surface thereof which will adhere the film to the surface with sufficient adhesion to preclude inadvertent removal while providing for ready removal thereof by peeling. The adhesive is specifically formulated not to mar or otherwise adversely affect the surface of the finish thereon and not to leave any residue thereon when the masking material is removed.

While providing some protection from the elements and from dust, dirt and minor scratching, previous masking materials provided little or no protection from dents, severe or major scratches, rubbing or pressure points and other hazards typically encountered during assembly, shipment and transport to the dealer. Such disadvantages and deficiencies in prior masking materials have resulted in necessary repairs, refinishing and other costly measures.

SUMMARY OF THE INVENTION

With the foregoing in mind, it is an object of the present invention to provide a masking material which obviates and overcomes the aforementioned disadvantages and deficiencies.

This object of the present invention is accomplished by a masking material comprising a first layer of plastic film having an adhesive on one face thereof to adhere the masking material to the surface to be protected, a second layer of cushioning material in superposed relation to the first layer and a third layer in superposed relation to the cushioning layer and secured around the periphery thereof to the first layer. The various layers may be selected to provide protection from specific hazards expected to be encountered by the surface to be protected.

BRIEF DESCRIPTION OF THE DRAWINGS

Some of the objects and advantages of the present invention having been stated, others will appear as the description proceeds when considered in conjunction with the accompanying schematic drawings, in which.

DETAILED DESCRIPTION OF THE ILLUSTRATED EMBODIMENTS

Figure 1:
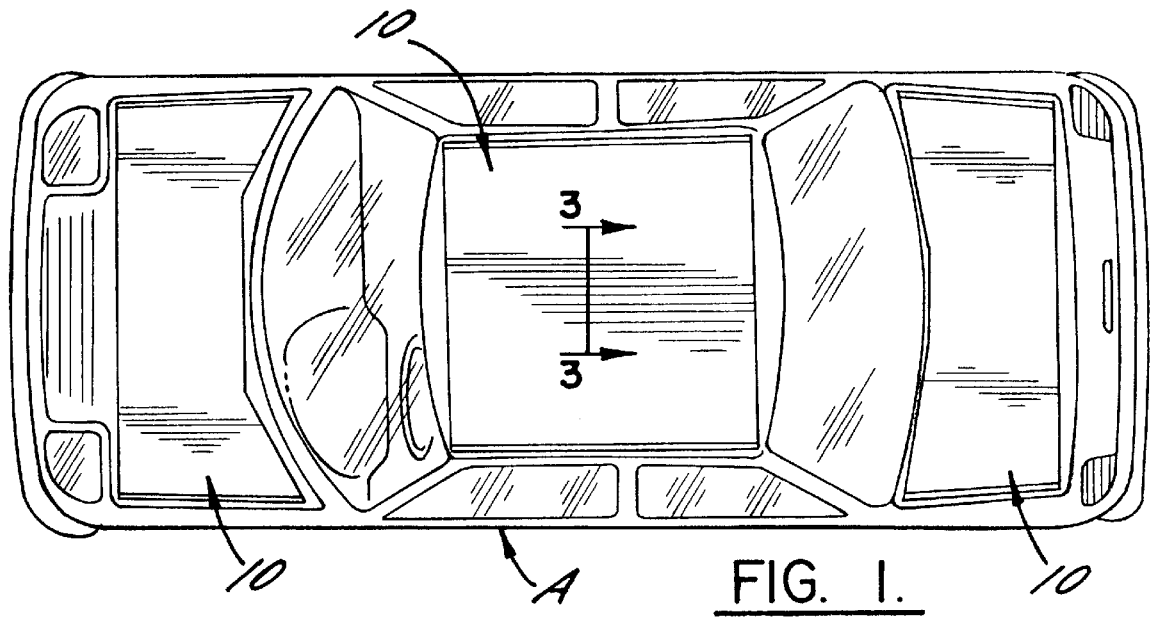
FIG. 1 is a plan view of an automobile having the masking material of the present invention applied to the surface thereof.
Figure 2:
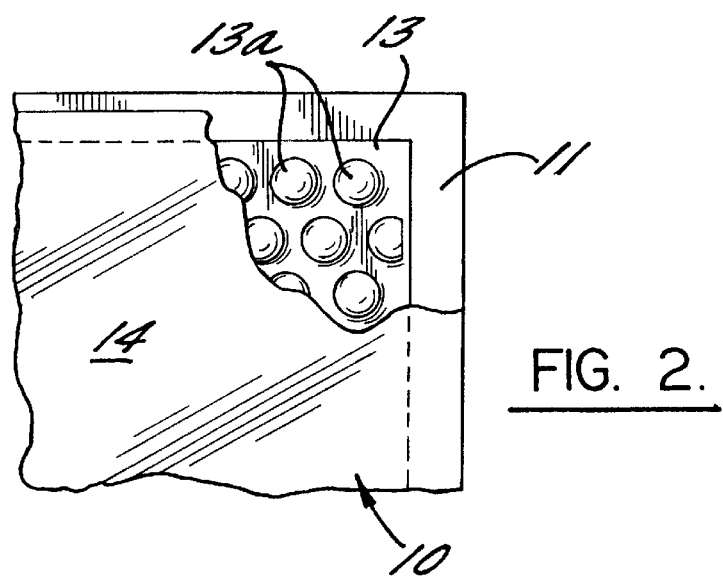
FIG. 2 is an enlarged fragmentary detail of one corner of the masking material shown in FIG. 1.
Figure 3:
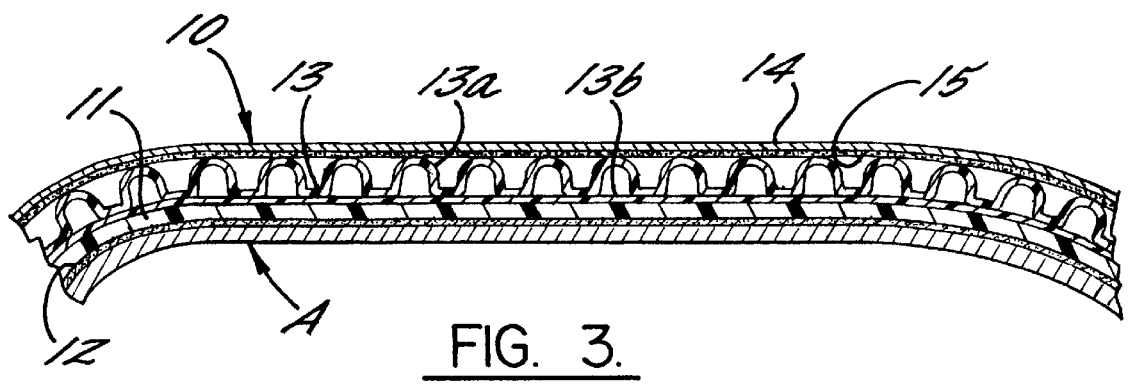
FIG. 3 is an enlarged, fragmentary sectional view taken substantially along line 3—3 in FIG. 1.

Referring now more specifically to the drawings and particularly to FIGS. 1–3, there is illustrated a masking material, generally indicated at 10, applied to the painted surface of an automobile A. It should be understood that the automobile A is exemplary only and that the masking material 10 may be used to protect the surface of any product without departing from the scope of this invention.

Masking material 10 includes a first layer 11 of a suitable plastic film selected to provide the desired characteristics in intimate contact with the surface to be protected. Such plastic film may be formed of polyethylene, polypropylene or blends thereof. Preferably, layer 11 is formed of a plastic film of a blend of polyethylene and polypropylene. Layer 11, when intended for use as an automobile masking material, preferably is formed of an approved acid rain protective type film of about 2.6 mil thickness. For other end uses, layer 11 may be any desired plastic film with characteristics dependent upon the hazards from which the surface is to be protected.

First layer 11 preferably has an adhesive coating or layer 12 on the lower surface thereof for adhering the masking material 10 to the surface being protected. The adhesive is a pressure sensitive adhesive which holds firmly but is readily peelable without damaging the surface or finish thereon and without leaving a residue. The adhesive may be selected from a wide variety available commercially. For use with automobiles, there are several such adhesives which have been approved by the automotive industry and are currently in use. Preferably, an acrylic based pressure sensitive adhesive is used.

Alternatively, first layer 11 may be formed of an adhesiveless, sticky or cling film which obviates the need for the adhesive coating 12. Such films are readily available on the market.

Masking material 10 also includes a second, cushioning layer 13 disposed in superposed relation to first layer 11. Preferably, cushioning layer 13 has a length and width less than the length and width of first layer 11 such that first layer 11 protrudes outwardly beyond the periphery of cushioning layer 13. Preferably, cushioning layer 13 is approximately twenty percent (20%) smaller than first layer 11 in all dimensions.

Cushioning layer 13 may be formed of any suitable cushioning material. The type of cushioning material selected may be dictated by many different factors, including, but not limited to, the hazards expected to be encountered, cost, durability, ability to withstand the elements, drapeability, etc. In FIG. 3, cushioning layer 13 is illustrated as an air cellular cushioning material formed of two layers 13a, 13b of plastic film having a multiplicity of entrapped air bubbles therebetween.

Lastly, masking material 10 includes a third or top layer 14 of plastic film disposed in superposed relation to cushioning layer 13 and first or bottom layer 11. Preferably, top layer 14 is larger than cushioning layer 13, but slightly smaller than bottom layer 11 in the widthwise dimension while having the same length as the bottom layer 11. In one form, the top layer 14 is approximately one-half (½) inch smaller in the cross or widthwise dimension than the bottom layer 11. Alternatively, the top layer 14 can have the same dimensions as the bottom layer 11 or can even be larger than bottom layer 11.

Preferably, top layer 14 has an adhesive coating 15 on the bottom surface thereof, much like adhesive coating 12 on bottom layer 11. Adhesive coating 15 adheres top layer 14 to cushioning layer 13 and to bottom layer 11 around the periphery of cushioning layer 13. If top layer 14 is larger than bottom layer 11, then the adhesive coating 15 will adhere top layer 14 to the surface being protected to the extent that top layer 14 protrudes beyond bottom layer 11.

While not preferred, it is contemplated that top layer 14 could have the adhesive coating 15 only on the area thereof that protrudes beyond cushioning layer 13 and is contiguous with bottom layer 11 and perhaps the surface being protected. In such case, the cushioning layer 13 would not be attached to the top layer 14 or bottom layer 11, but would be confined therebetween.

The plastic film from which top layer 14 is formed may be the same as the plastic film forming bottom layer 11 or may be different. Preferably, top layer 14 is formed of the same plastic film as bottom layer 11 except that top layer 14 preferably has a matt finish while bottom layer 11 preferably has a regular, shiny finish. Again, the selection of the plastic film to be used will depend on many factors, including, but not limited to, the hazards to be encountered, etc.

The masking material 10 provides numerous advantages, including, but not limited to, protection of the surface from dents, scratches, rub or pressure points, acid rain, droppings, stone chips, rail dust, etc.; an aerodynamic profile which causes all four edges to be intimate with or flat against the surface which keeps the masking material 10 from becoming dislodged during transport by outside elements penetrating under the masking material 10 and lifting the masking material 10 from the surface; any sharp edges of the cushioning layer 13 are covered by the bottom layer 11 and top layer 14 and therefore cannot damage the surface or finish thereon.

Figure 4:
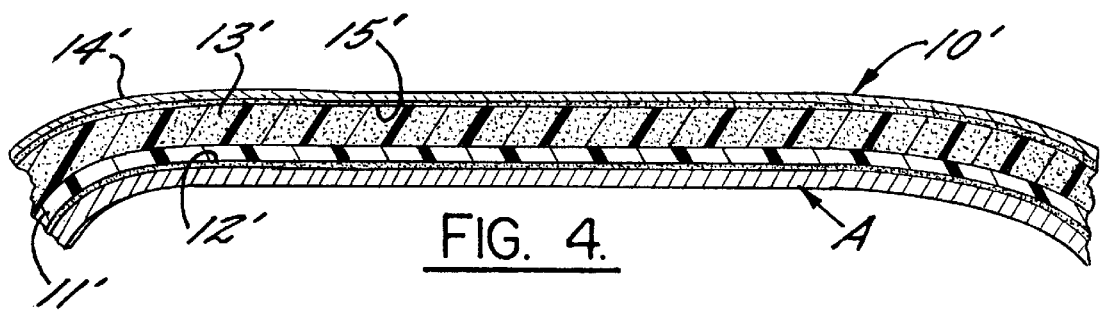
FIG. 4 is a view similar to FIG. 3 of another embodiment of the present invention.

In FIG. 4, another embodiment of the masking material of the present invention is illustrated and is generally referred to at 10'. Masking material 10' includes a bottom layer 11' having an adhesive coating 12' thereon, a cushioning layer 13', and a top layer 14' having an adhesive coating 15' thereon. With the exception of cushioning layer 13', the remainder of masking material 10' is substantially similar to masking material 10. Cushioning layer 13' preferably is formed of a foam material which may be polyethylene foam, polypropylene foam or any other suitable foam material.

Figure 5:
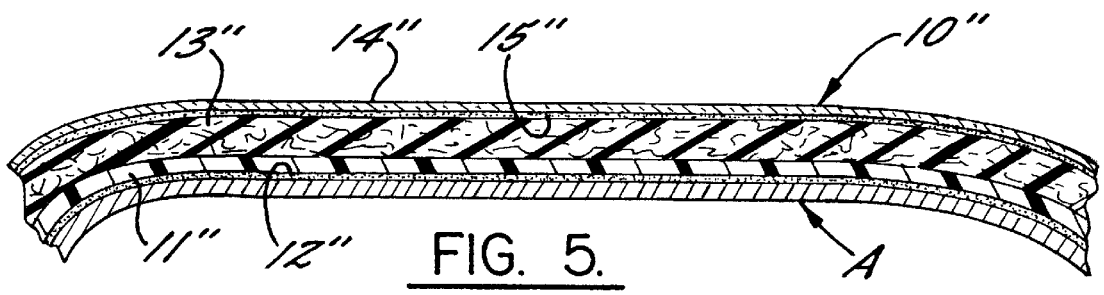
FIG. 5 is a view similar to FIGS. 3 and 4 of a further embodiment of the present invention.

In FIG. 5, a further embodiment of the masking material of the present invention is illustrated and is generally indicated at 10". Masking material 10" includes a bottom layer 11", a cushioning layer 13" and a top layer 14". Bottom layer 11" preferably has an adhesive coating 12" thereon, and top layer 14" preferably has an adhesive coating 15" thereon. Cushioning layer 13" is formed of a fibrous non-woven batt of suitable thickness and shock absorbency. Numerous non-woven batts are known and currently available commercially.

Figure 6:
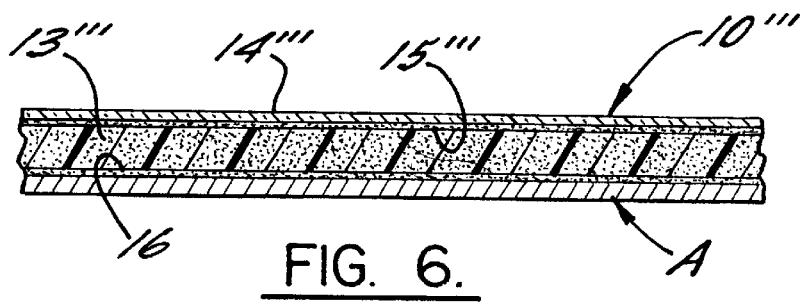
FIG. 6 is a view similar to FIGS. 3–5 of a still further embodiment of the present invention.

In FIG. 6, a still further embodiment of the masking material of this invention is illustrated and generally indicated at 10'''. Masking material 10''' includes a cushioning layer 13''' of any of the disclosed cushioning materials or any other suitable cushioning material. Cushioning layer 13''' is attached or adhered to the surface to be protected, preferably by an adhesive coating 16 thereon. Masking material 10''' further includes a top layer 14''' having an adhesive coating 15''' thereon.

Figure 7:
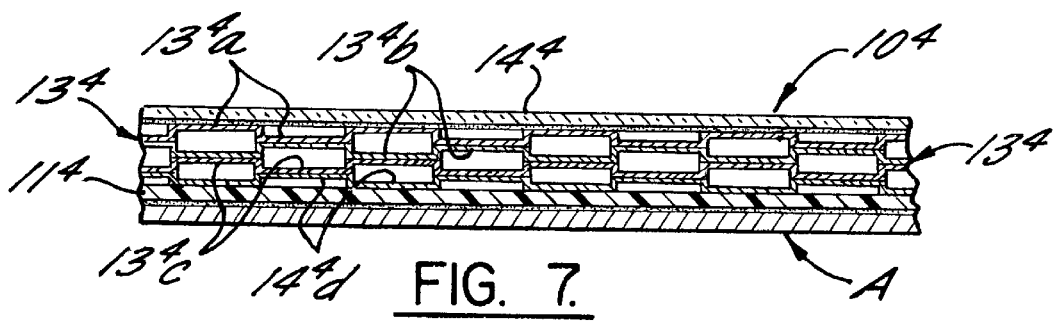
FIG. 7 is a view similar to FIGS. 3–6 of yet another embodiment of the present invention.

In FIG. 7, yet another embodiment of the masking material of this invention is illustrated and generally indicated at $10^4$. Masking material $10^4$ includes a cushioning layer $13^4$ of tissue paper. Cushioning layer $13^4$ preferably is formed of multiple layers $13^4a$, $13^4b$, $13^4c$ and $13^4d$ of embossed tissue paper having the embossed areas thereof out of registry. Preferably, masking material $10^4$ also includes a bottom layer $11^4$ and a top layer $14^4$.

Figure 8:
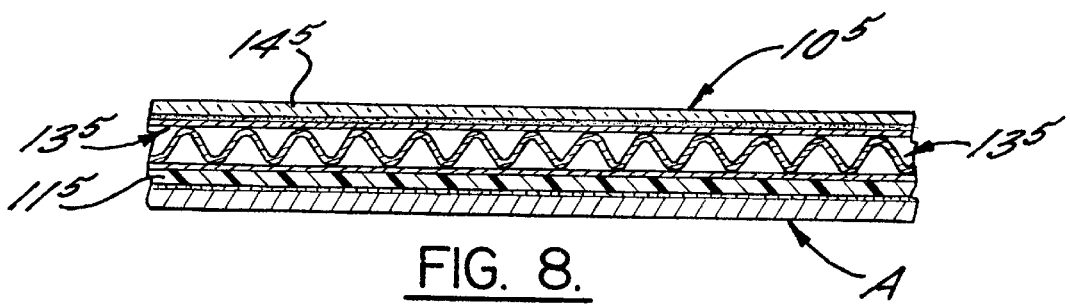
FIG. 8 is a view similar to FIGS. 3–7 of a still further embodiment of the present invention.

In FIG. 8, a still further embodiment of the masking material of this invention is illustrated and generally indicated at $10^5$. Masking material $10^5$ includes a cushioning layer $13^5$ of corrugated paperboard. Masking material $10^5$ also includes a bottom layer $11^5$ and a top layer $14^5$.

In the drawings and specifications, there has been set forth a preferred embodiment of the invention, and although specific terms are employed, they are used in a generic and descriptive sense only and not for purposes of limitation, the scope of the invention being set forth in the following claims.

That which is claimed is:

1. An automobile masking material for protecting a finished surface of an automobile, during handling, shipment or transit comprising a multi-layer composite having sufficient flexibility and conformability to contact intimately and conform to and mask the surface to be protected and comprising a bottom layer of flexible plastic film having predetermined lengthwise and widthwise dimensions, said bottom layer having a lower surface that is sufficiently smooth to conform to and intimately contact the surface to be protected and having adhesive characteristics to adhere to the surface to be protected, a cushioning layer in superposed relation to said bottom layer and having lengthwise and widthwise dimensions no larger than the lengthwise and widthwise dimensions of said bottom layer, and a top layer of plastic film disposed in superposed relation to said cushioning and bottom layers, and having lengthwise and widthwise dimensions larger than the lengthwise and widthwise dimensions of said cushioning layer so that said top layer protrudes beyond said cushioning layer around the periphery thereof a predetermined distance, said top layer being attached at least to said bottom layer around the periphery of said cushioning layer so that said cushioning layer is confined between said top and bottom layers, whereby said masking material intimately contacts, conforms to and adheres to the finished surface to be protected.

2. A masking material according to claim 1 wherein said cushioning layer is formed of air cellular material.

3. A masking material according to claim 1 wherein said cushioning layer is formed of a foam material.

4. A masking material according to claim 1 wherein said cushioning layer is formed of a non-woven, fibrous batt.

5. A masking material according to claim 1 wherein said cushioning layer is formed of a material selected from the group of paper tissue, embossed paper tissue and cardboard.

6. A masking material according to claim 1 wherein said bottom layer has an adhesive coating on the lower surface thereof.

7. A masking material according to claim 1 wherein said bottom layer is formed of an adhesiveless, sticky or cling plastic film such that the lower surface thereof has self-adhesive properties.

8. A masking material according to claim 1 wherein said top layer has an adhesive coating on at least the protruding position thereof attached to said bottom layer.

9. A masking material according to claim 1 wherein said top layer is also attached to said cushioning layer.

10. A masking material according to claim 9 wherein said top layer has an adhesive layer on the surface thereof contiguous with said cushioning and bottom layers.

11. A masking material according to claim 9 wherein said top layer is heat laminated to said cushion layer and to said bottom layer.

12. A masking material according to claim 9 wherein said top layer is formed of an adhesiveless, sticky or cling plastic film such that the lower surface thereof has self-adhesive properties.

13. A masking material according to claim 1 wherein said top layer has a lengthwise dimension the same as the lengthwise dimension of said bottom layer.

14. A masking material according to claim 1 wherein said top layer has a widthwise dimension less than the widthwise dimension of said bottom layer.

15. A masking material according to claim 1 wherein said top layer has widthwise and lengthwise dimensions greater than the dimensions of said bottom layer and said bottom layer has the same dimensions as said cushioning layer.

16. An automobile masking material for protecting a finished surface of an automobile, during handling, shipment or transport comprising a multi-layer composite having sufficient flexibility and conformability to contact intimately and conform to and mask the surface to be protected and comprising a flexible cushioning layer having predetermined lengthwise and widthwise dimensions and a sufficiently smooth and conformable lower surface to contact intimately and conform to the surface to be protected, and a flexible top layer disposed in superposed relation to said cushioning layer and having lengthwise and widthwise dimensions larger than the lengthwise and widthwise dimensions of said cushioning layer so that said top layer protrudes beyond said cushioning layer around the periphery thereof a predetermined distance, said top layer being attached to said cushioning layer over the contiguous surfaces thereof, and at least said top layer having adhesive characteristics on at least the portions thereof protruding beyond said cushioning layer so that said top layer is adapted to be adhered to the finished surface to be protected.

17. A masking material according to claim 16 wherein said top layer has an adhesive coating on the lower surface thereof to adhere said top layer to said cushioning layer and to the surface to be protected, and said cushioning layer has an adhesive coating on the lower surface thereof to adhere said cushioning layer to the surface to be protected.

18. A masking material according to claim 16 wherein said top layer has an adhesive coating on the lower surface thereof to adhere said top layer to said cushioning layer and to the surface to be protected.

19. An automobile masking material for protecting a surface of an automobile during handling, shipment or transit comprising a multi-layer composite having sufficient flexibility and conformability to contact intimately and conform to and mask the surface to be protected and comprising a flexible bottom layer of breathable plastic film having predetermined lengthwise and widthwise dimensions, said bottom layer having a smooth and conformable lower surface to contact intimately and conform to the surface being masked and having adhesive characteristics to adhere to the surface to be protected;

a flexible breathable cushioning layer in superposed relation to said bottom layer and having lengthwise and widthwise dimensions smaller than the lengthwise and widthwise dimensions of said bottom layer so that said bottom layer protrudes beyond said cushioning layer around the periphery therof a predetermined distance, and a top layer of flexible breathable plastic film disposed in superposed relation to said cushioning and bottom layers and having lengthwise and widthwise dimensions larger than the lengthwise and widthwise dimensions of said cushioning layer so that said top layer protrudes beyond said cushioning layer a predetermined distance, said top layer being attached at least to said bottom layer beyond and around the periphery of said cushioning layer so that said cushioning layer is confined between said top and bottom layers, whereby said masking material intimately contacts, conforms to and adheres to the finished surface to be protected.

20. A masking material according to claim 19 wherein said bottom layer has an adhesive on the lower surface thereof, and including a release liner covering said lower surface of said bottom layer and said adhesive to prevent contamination prior to usage.

21. An automobile masking material for protecting a surface of an automobile during handling, shipment or transport comprising a multi-layer composite having sufficient flexibility and conformability to contact intimately and conform to and mask the surface to be protected and comprising a flexible cushioning layer having predetermined lengthwise and widthwise dimensions, and a flexible bottom layer disposed beneath and in superposed relation to said cushioning layer and having lengthwise and widthwise dimensions larger than the lengthwise and widthwise dimensions of said cushioning layer so that said bottom layer protrudes beyond said cushioning layer around the periphery thereof, said cushioning layer being attached to said bottom layer over contiguous surfaces thereof, and said bottom layer having a smooth and conformable lower surface to contact intimately and conform to the surface to be protected.

* * * * *